Jan. 16, 1940. P. CARBONARA 2,187,539
MINER'S LANTERN
Filed March 29, 1937
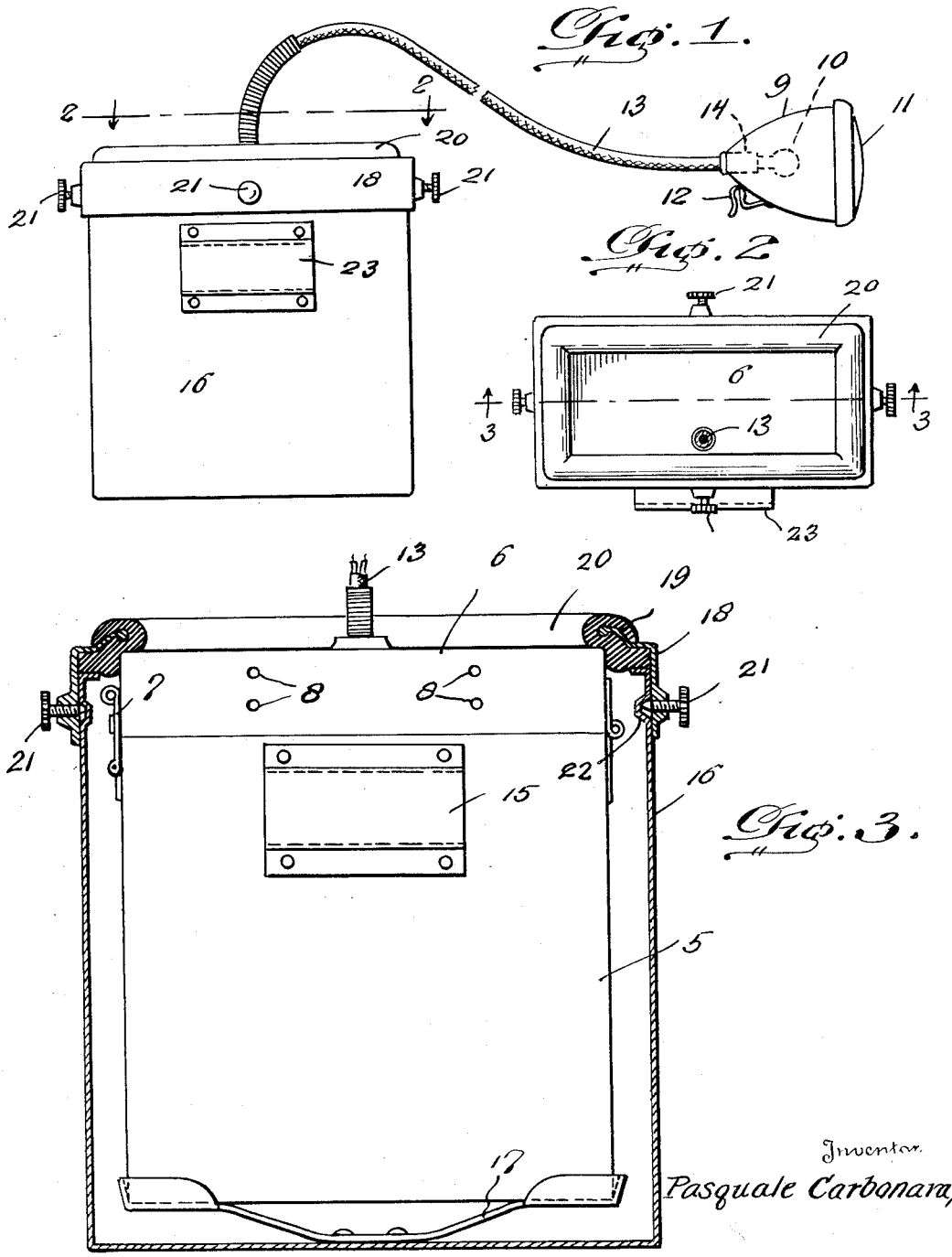

Patented Jan. 16, 1940

2,187,539

UNITED STATES PATENT OFFICE 2,187,539

MINER'S LANTERN

Pasquale Carbonara, Uniontown, Pa.

Application March 29, 1937, Serial No. 133,674

1 Claim. (Cl. 136—166)

This invention relates to miner's lanterns of the type including a light projector adapted to be carried in the hand or attached to the front of the miner's cap, a wet cell storage battery for supplying current to the lamp of the light projector and adapted to be supported against a hip of the miner by means of a waist-line belt, the light projector being connected with the terminals of the battery by means of a cable embodying conductor wires attached to the terminals of the light projector and the battery.

In using miners' lanterns of the above kind, the storage battery is often struck against objects in the mine so as to cause damage to the battery and often causing the liquid electrolyte of the battery to be splashed out of the battery onto the clothes of the miner, with consequent damage to the miner's clothes and even injury to the miner by reason of the burning action of the electrolyte.

The primary object of the present invention, therefore, is to provide a protective carrying case for the wet cell storage battery of an electric miner's lantern, which will effectively protect the battery against damage when in use, and which will catch any electrolyte splashed from the battery and prevent it from damaging the miner's clothes or injuring the miner.

A more particular object is to provide a carrying and protective case of the above kind which is efficient in use, simple in construction, economical to manufacture and convenient to use.

Other objects will appear as the nature of the invention is better understood, and the invention consists in the novel form, combination and arrangement of parts hereinafter more fully described, shown in the accompanying drawing and claimed.

In the drawing:

Figure 1 is an elevational view of an electric miner's lantern embodying a battery case constructed in accordance with the present invention.

Figure 2 is a horizontal section on line 2—2 of Figure 1 showing the battery and battery case in top plan; and Figure 3 is an enlarged central vertical section on line 3—3 of Figure 2.

Referring in detail to the drawing, 5 indicates the ordinary wet cell storage battery of an electric miner's lamp, which storage battery includes an ordinary wooden receptacle containing the battery cells and provided with a hinged lid or cover 6 which has means 7 for fastening it in closed position and is provided with suitable apertures 8 for ventilation. The lantern also includes a suitable light projector including a reflector casing 9 containing the usual electric lamp 10 and closed at the front by means of a transparent closure plate or lens 11. This light projector may be carried in the hand and may be provided with a suitable clip 12 or other means to facilitate attachment of the light projector to the front of the miner's cap. The light projector is connected with the battery by means of a cable 13 containing the necessary conductor wires for electrically connecting the terminals of the battery 5 with the terminals of the socket 14 in which the lamp 10 is mounted. The cable 13 passes through the lid 6, and the battery 5 has the usual external horizontal loop member 15 through which a waist-line belt is ordinarily passed to facilitate attachment of the battery to the miner's body with the battery resting against a hip of the miner. In use, the battery is ordinarily subjected to damage when struck against objects in the mine, a somewhat frequent occurrence. Also, when the battery 5 is struck against objects, the liquid electrolyte in the battery cells is often splashed out of the latter between the battery proper and its lid 6 as well as through the ventilating openings 8. When this occurs, the electrolyte often burns the miner's clothes and flesh with consequent serious and painful damage and injury.

The present invention provides a protective carrying case 16 for receiving and enclosing the battery 5 and its lid 6. This protective carrying case consists of a rectangular open top receptacle adapted to receive the battery 5 and of a depth slightly greater than the depth of the battery 5 and its lid 6 so that any electrolyte splashed or spilled from the battery will be caught in the protective carrying case 16 and prevent it from running onto the miner's clothes. Also, the carrying case 16 will receive the damage incident to striking the same against objects in the mine so as to protect the battery 5 from damage through this source. In the specific embodiment shown, the carrying case 16 is slightly larger than the battery 5 and its lid 6, and is provided at the bottom with a yieldable support 17 upon which the battery 5 rests, and by means of which the battery is positioned in spaced relation to the sides and bottom of the carrying case 16. The battery may be firmly maintained in this position by means of a fastening ring 18 removably fitted over the upper portion of the case 16 and having an inwardly projecting continuous top flange 19 embedded in a continuous yieldable gasket 20 made of rubber or the like and arranged to snugly contact the upper corners of the battery lid 6. It will be noted that the gasket 20 engages around the upper corners of the battery lid 6 so as to maintain the spaced relation between the sides of the battery and the carrying case at the top of the latter. Also, when the ring 18 is placed on the top of the case 16 the battery is forced downwardly so as to place the yieldable support 17 under slight tension and thereby firmly maintain the battery against vibration or displacement when the device is subjected to ordinary shocks or jars. Any suitable means may be provided for removably securing the ring 18 in place upon the top of the case 16, such as set screws 21 threaded through the ring 18 and engaging in socket 22 provided in the upper portion of the walls of case 16. As the battery is contained completely in the carrying case, the loop 15 of the battery cannot be used and another similar loop 23 is fastened on the outside of the case 16 for reception of the waist-line belt whereby the device is fastened upon the miner's body with the battery and its case 16 resting against the hip of the miner.

While I have shown and described a specific embodiment of the invention which is quite efficient and preferred, it will nevertheless be understood that the invention is susceptible of various changes or modifications such as fairly fall within the spirit and scope of the appended claim.

What I claim as new is:

In combination, an open-top carrying case completely closed except for the top opening, a wet cell storage battery arranged in said case, a cover for the battery having side walls provided with ventilating apertures and a top wall provided with an opening, a cable extending through said opening and connected to the terminals of the battery, said top wall being devoid of perforations other than said opening, a resilient support for the battery fixed on the bottom of the case and positioning the battery in spaced relation to the side walls of said case, and a ring removably secured on the top of said case and engaging the battery cover to firmly hold the battery in position, said ring having an inwardly directed flange provided with a resilient gasket engaging the top of the battery cover along all sides of the latter so that any electrolyte splashed or spilled from the battery will be caught in the protective case.

PASQUALE CARBONARA.